J. E. BURTON.
DRAG ATTACHMENT FOR PLOWS.
APPLICATION FILED SEPT. 10, 1908.
969,130.
Patented Aug. 30, 1910.
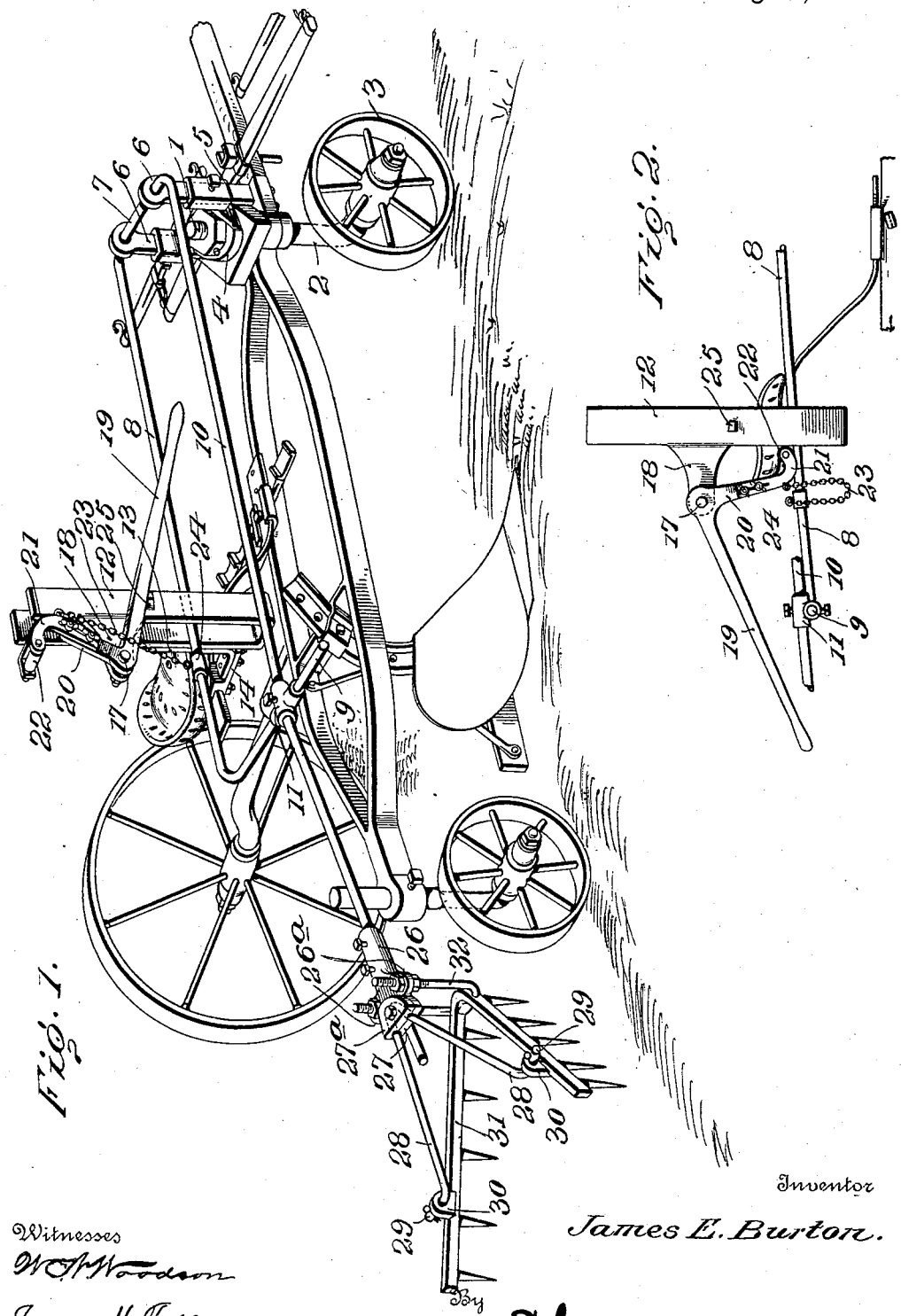
Witnesses
W. H. Woodson
Juana M. Fallin
Inventor
James E. Burton.
By
H. A. Macey, Attorneys.
THE NORRIS PETERS CO., WASHINGTON, D. C.

UNITED STATES PATENT OFFICE.

JAMES E. BURTON, OF WHITEWATER, WISCONSIN.

DRAG ATTACHMENT FOR PLOWS.

969,130.  Specification of Letters Patent.  Patented Aug. 30, 1910.

Application filed September 10, 1908. Serial No. 452,435.

*To all whom it may concern:*

Be it known that I, JAMES E. BURTON, a citizen of the United States, residing at Whitewater, in the county of Walworth and State of Wisconsin, have invented certain new and useful Improvements in Drag Attachments for Plows, of which the following is a specification.

This invention comprehends certain new and useful improvements in drag or harrow attachments for plows, and the invention has for its object a simple, durable and efficient construction of device of this character which may be easily applied to any of the conventional forms of sulky or walking plows to harrow, smooth or otherwise treat the soil when it is first turned and exposed to the sun and air, before the clods shall have had time to harden and the moisture absorbed, the soil being treated at a time when it is more easily pulverized and the working being completed without the mark of a horse's hoof on the surface of the ground. And the invention also has for its object an improved construction of device of this character which may be easily manipulated by the operator to vary the depth at which the drag attachment shall operate or be elevated into an inoperative position, when turning corners or traveling along the roads to the fields to be cultivated.

With these and other objects in view, the invention consists in certain construction, combinations and arrangements of the parts that will be hereinafter described and claimed.

For a full understanding of the invention, reference is to be had to the following description and accompanying drawings, in which:

Figure 1 is a rear perspective view of a sulky plow equipped with the improvements of my invention; and, Fig. 2 is a side elevation of a portion of the drag supporting frame and lever for raising and lowering the same.

Corresponding and like parts are referred to in the following description and indicated in all the views of the drawings by the same reference characters.

In carrying out my invention I mount upon the upwardly projecting end 1 of the standard or shaft 2 for the front furrow wheel 3, a bearing casting 4 which is formed with two upwardly projecting arms 5 and is so mounted that the said shaft 2 may be turned about a horizontal axis without imparting any movement to the bearing, it being essential that said bearing shall remain substantially stationary. The arm 5 is formed with a rectangular socket. Bars 6 are received in the respective sockets and are held for a vertical adjustment therein, being secured by set screws, as shown. The bars are formed with apertures in which the front cross bar 7 of a framelike support is mounted. This support embodies, in addition to the cross bar 7, the inner longitudinal bar 8 formed with an angularly disposed and outwardly projecting rear end 9 and a corresponding outer longitudinal bar 10 which extends parallel to the bar 8 and rearwardly beyond the angularly disposed rear end 9 thereof. The bar 10 is connected to the angularly disposed end 9 of the other bar 8, by means of a coupling 11 held in adjusted position by means of set screws so that the distance laterally between the bars 10 and 8 may be adjusted as required, to hold the drag attachment at the required lateral distance from the plow.

The innermost longitudinal bar 8 extends rearwardly through a loop or keeper 12, which is vertically elongated, as shown, and the innermost side bar of which is connected by rivets, bolts, or similar fastening devices to the upwardly projecting arm 13 of a sectional bracket, the horizontally extending section 14 of said bracket being formed with a loop by which it may be slipped over the seat spring of the plow, being secured to said seat spring by preferably the same bolt which secures the driver's seat to the seat spring.

An adjusting lever which is substantially of bell crank form, is fulcrumed at its elbow, as indicated at 17, on a rearwardly projecting bracket 18 which is formed on the outermost side bar of the loop 12. One end of this lever constitutes a handle 19, while the other arm, designated 20, is provided with an extensible section 21, the outer end of said section carrying a roller 22, as best illustrated in Fig. 1. A chain or cable 23 is connected at one end to the adjusting lever and is fastened at its other end to a sleeve 24 which is adjustably secured in any desired way to the innermost longitudinal bar 8. It is to be particularly noted that the fulcrum of the adjusting lever is so arranged with respect to the points of attachment of the chain 23 with said lever and the frame support for the drag attachment, that when the lever is rocked to the position illustrated in Fig. 1 with its handle against the lug 25 projecting laterally from the loop 12, the fulcrum point 17 of the lever will be to the rear of a line drawn through said points of attachment of the chain 23, whereupon the parts will be automatically held by gravity with the drag support in an elevated position, thereby holding the drag attachment in an elevated or inoperative position.

Ordinarily, the weight of the harrow or other drag attachment is sufficient for ordinary soil; but to secure a further penetration of the harrow teeth for use in connection with the frame of the drag attachment, I provide the extensible section 21 before mentioned, with its roller 22. To secure the desired results, this extension is adjusted outwardly to the required degree, and the adjusting lever is rocked to the position illustrated in Fig. 2, where the weight of the handle arm 19 and the position of the roller 22 with respect to the fulcrum 17 will cause the arm 20, or the extension 21 thereof, to be held in locked position against the rear side of the loop 12, with the roller 22 bearing downwardly upon the bar 8. Obviously, this arm may be adjusted in this position so as to impose greater or less pressure upon the bar 8, and thereby regulate the depth of the operative position of the drag attachment.

The rearwardly extending end of the outermost longitudinal bar 10 of the drag support has a coupling sleeve 26 secured to it. This coupling sleeve 26 is formed at its rear end with a grooved extension 27 in which diverging legs 28 fit, said legs being held in the groove of the extension 27 by means of a grooved clamp plate 27ª and a bolt passing through the plate into the extension. The legs 28 extend downwardly as well as rearwardly and are formed with outstanding rear extensions 29 designed to project through and to be held by cotter pins or the like, in apertured lugs 30 formed on the frame 31 of the harrow or similar drag attachment. The front end or nose of the frame 31 has a preferably U-shaped brace 32 connected thereto, the upwardly extending arms of said brace passing through apertured ears 26ª formed on the coupling sleeve 26, being secured therein at the desired adjustment by means of nuts, as shown, so that the harrow or other drag attachment may be tilted to the desired inclination.

It is to be understood that my invention is not limited to any specific form of drag attachment, as I may use a toothed or disk harrow, a roller, pulverizer or similar instrument.

Having thus described the invention, what is claimed as new is:

1. The combination with a plow, of a drag support pivotally mounted thereon to swing about a horizontal axis, a drag carried by the rear end of said support, a vertically disposed keeper secured to the plow, a bell crank lever fulcrumed on said keeper, a chain connected at one end to one arm of said lever and at its other end to the drag support, said arm of said lever being provided with a longitudinally adjustable section, and an off-set roller carried by said extension, for the purpose specified.

2. The combination with a plow, of a drag support pivotally mounted thereon and embodying a longitudinally extending bar, a sleeve adapted to be slipped over the rear end of said bar and formed with laterally extending apertured ears and with an upwardly facing groove at the rear of said ears, diverging legs mounted at their juncture in said grooves and held therein, said legs extending downwardly and rearwardly from said sleeve, a drag suspended intermediate of its front and rear ends on the lower ends of said legs, and a U-shaped brace connected to the front end of the drag, the arms of said brace extending upwardly through said apertured ears and being adjustably secured therein, as and for the purpose set forth.

In testimony whereof I affix my signature in presence of two witnesses.

JAMES E. BURTON. [L. S.]

Witnesses:
ALBERT SCHALLER,
HENRY MARKS.